United States Patent
Shioi et al.

(10) Patent No.: US 6,944,629 B1
(45) Date of Patent: Sep. 13, 2005

(54) METHOD AND DEVICE FOR MANAGING MULTIMEDIA FILE

(75) Inventors: Masahiro Shioi, Chiba (JP); Keiichi Hibi, Matsudo (JP); Toshio Nomura, Ichihara (JP)

(73) Assignee: Sharp Kabushiki Kaisha, Osaka (JP)

(*) Notice: Subject to any disclaimer, the term of this patent is extended or adjusted under 35 U.S.C. 154(b) by 0 days.

(21) Appl. No.: 09/786,779

(22) PCT Filed: Sep. 6, 1999

(86) PCT No.: PCT/JP99/04830

§ 371 (c)(1),
(2), (4) Date: Jun. 13, 2001

(87) PCT Pub. No.: WO00/14741

PCT Pub. Date: Mar. 16, 2000

(30) Foreign Application Priority Data

Sep. 8, 1998 (JP) .................................. 10-253385

(51) Int. Cl.$^7$ .......................................... G06F 17/30
(52) U.S. Cl. ........................ 707/104.1; 707/2; 707/5; 707/10; 709/203; 709/219; 382/232
(58) Field of Search ............................ 707/2, 3, 5, 10, 707/100, 104.1; 709/203, 219; 704/233; 382/232; 375/240.16

(56) References Cited

U.S. PATENT DOCUMENTS

| | | | | |
|---|---|---|---|---|
| 5,049,991 A | * | 9/1991 | Niihara | .................. 375/240.16 |
| 5,822,524 A | * | 10/1998 | Chen et al. | .................. 709/203 |
| 5,903,892 A | * | 5/1999 | Hoffert et al. | ................. 707/10 |
| 5,983,176 A | * | 11/1999 | Hoffert et al. | .............. 704/233 |
| 6,065,050 A | * | 5/2000 | DeMoney | .................... 709/219 |
| 6,282,549 B1 | * | 8/2001 | Hoffert et al. | ........... 707/104.1 |
| 6,370,543 B2 | * | 4/2002 | Hoffert et al. | ........... 707/104.1 |
| 6,374,260 B1 | * | 4/2002 | Hoffert et al. | ........... 707/104.1 |
| 6,661,923 B1 | * | 12/2003 | Koike et al. | ................. 382/232 |

FOREIGN PATENT DOCUMENTS

| | | |
|---|---|---|
| JP | 61066278 | 4/1986 |
| JP | 05109240 | 4/1993 |
| JP | 05210952 | 8/1993 |
| JP | 6-195880 | 7/1994 |
| JP | 7-95586 | 4/1995 |
| JP | 7-122040 | 5/1995 |
| JP | 9-200772 | 7/1997 |
| JP | 10-320969 | 12/1998 |

* cited by examiner

*Primary Examiner*—Shahid Alam
(74) *Attorney, Agent, or Firm*—David G. Conlin; John J. Penny, Jr.; Edwards & Angell, LLP

(57) ABSTRACT

A managing method for a multimedia file includes the steps of: generating index information including a source identifier expressing a source having one or more of management units associated with the multimedia file as a title frame, positions of a leading frame and tail frame of the title frame in the source, and a position of a reference frame for decoding the leading frame; and recording the index information onto a recording medium, attaching the index information to the multimedia file. The managing method for a multimedia file may include the steps of: causing a user to specify one or more of the management units associated with the multimedia file as a title frame; generating index information in which a bit stream obtained by encoding a specified title frame is embedded, and recording the index information onto a recording medium, attaching the index information to the multimedia file.

10 Claims, 12 Drawing Sheets

```
TITLE FRAME SPECIFYING PORTION FORMAT
NUMBER OF TITLE ELEMENTS
LOOP (NUMBER OF TITLE ELEMENTS){
   REFERENCE/EMBEDDING FLAG
   IF (REFERENCE){
      TITLE FILE NAME
      TITLE REFERENCE FRAME POSITION
      TITLE LEADING FRAME POSITION
      TITLE TAIL FRAME POSITION
   }
   ELSE{
      EMBEDDED LENGTH
      CODING SYSTEM INFORMATION
      BIT STREAM
   }
}
```

METHOD AND DEVICE FOR MANAGING MULTIMEDIA FILE

TECHNICAL FIELD

The present invention relates to management of a multimedia file, and particularly, to a method and apparatus for managing a multimedia file by linking index information to the multimedia file in order to identify contents of the multimedia file with ease.

BACKGROUND ART

With the advent of the advanced semiconductor technology, sophisticated image processing technology, growth in high speed network, and further, widespread use of digital video cameras, digital still cameras and the digital sound recording/reproducing technology in recent years, the number of multimedia files requiring management has been increasing. In a case where many of multimedia files are to be managed, a need for some contrivance arises in order to specify contents of a multimedia file. The most popular way adopted for the purpose is to give a title that expresses contents of the multimedia file to the multimedia file itself. For example, a title "Birthday Party for My Wife in '95" is the case.

Furthermore, a case exists such that a comment on a file can be attached to the file as an attribute or additional information thereof in some of operating systems (OS) for a personal computer. On such an operating system, information expressing contents of a file can be further attached to the file attribute or additional information in addition to a title of the file. Generally speaking, while there is a limitation on a length of a title, a length of information which can be attached to a file as an attribute thereof is longer than the limitation; therefore, more detailed information can be provided.

When information that expresses contents of a multimedia file as a title or an attribute is attached to the multimedia, a person responsible for linking the title or information would be able to identify a desired file among many of files. Others, however, will have difficulty in correctly knowing contents of a multimedia file based solely on a title or information attached to the multimedia file. Especially, it will be more difficult to find a multimedia file with desired contents among many files based solely on a title or such information thereof. Consequently, it has been a common practice to investigate contents of multimedia files one by one to identify the contents thereof to find out a desired multimedia file.

A technique to solve such a problem is disclosed in Japanese Patent Laying-Open No. 6-195880(1994). The technique disclosed in the publication relates to an image file including, for example, an intra-coded picture (referred to as I picture) as defined in MPEG (Moving Picture coding Experts Group). An I picture is obtained by encoding one frame of an image to be encoded, regarding it as a still picture. That is, the I picture is a frame image encoded without using interframe prediction. Hence, the original frame can be decoded without referring to another picture.

According to this prior art technique, one or a plurality of I frames (frame constituted of an I picture) in each image file are selected in advance, selected encoded data itself or position information of the selected encoded data in the image file is extracted and the data or the information is linked to the head end of the image file as a management heading. Thus, frames expressed with encoded datas are restored based on management headings at the heads of many image files and displayed into a list.

FIG. 1 shows a file structure that was adopted in the prior art. Referring to FIG. 1, an image file 30 includes: a management heading 32 stored on a recording medium such as a hard disk; and a moving picture data 34 consisting of I frames cyclically placed and a plurality of P frames inserted between I frames. The P frame is a frame constituted of a P picture (predictive-coded picture) obtained by encoding based on prediction from the previous I frame of the frame of interest. The management heading 32 contains information specifying contents of a selected I frame itself or a position of the selected I frame.

FIG. 2 shows a system configuration for outputting a prior art image file 30. In this system, position information of a selected I frame is stored in the management heading 32. Referring to FIG. 2, a prior art system 40 includes: a title frame specifying section 42 for specifying one or more I frames representing contents of each of image files; a title frame position analyzing section 44 for analyzing a position of the one or more I frames in each of image files; and a title frame information generating section 46 for attaching information on the position of the one or more I frames analyzed by the title frame position analyzing section 44 to the head of the each of image files as a management heading 32. Note that the title frame specifying section 42 specifies a default value (for example, an I frame at the leading place) as a title frame when no title frame is specified by a user.

In each of image files, some of I frames arranged cyclically are inevitably contained. Data in an I frame can be presented to a user in the form which the user can see without the help of data of another frame, similar to a still picture. Hence, any one can see an image of an I frame specified by the heading of an image file to identify contents of the image file and determine whether or not the image file is a desired one.

The technique shown in the publication of the above described Japanese Patent Laying-Open No. 6-195880 (1994) has some of problems remaining to be solved. First of all, in this prior art technique, an I frame is limitedly selectable for a management heading. Even if a desired image is intended to be a heading image, the desired image cannot be a heading image when it is not of an I frame. Hence, in the prior art, a user cannot specify an arbitrarily selected frame as a heading image.

Furthermore, in a case where there is a file that expresses satisfactorily contents of a multimedia file as a different file from the contents of the multimedia file, a problem arises in that the different file cannot be specified as a title frame for a heading. In such a case, the different file can be desirably specified as a heading of the multimedia information file.

Besides, in a case where a title frame is a picture, it is more preferably used because of directly expressing the contents of a file if not only a still picture but also any moving picture can be specified.

The invention has been made in order to solve the above described problems and it is accordingly an object of the invention to provide a method and apparatus for managing a multimedia information file capable of specifying any frame as a title frame for use in a heading.

It is another object of the invention to provide a method and apparatus for managing a multimedia information file capable of specifying not only a still picture but also a moving picture as a heading image.

It is still another object of the invention to provide a method and apparatus for managing a multimedia information file capable of specifying any frame of any file including a file other than a multimedia information file to be processed as a heading image.

It is yet another object of the present invention to provide a method and apparatus for managing a multimedia information file capable of specifying not only a still picture but also a moving picture including a file other than a multimedia information file to be processed as a heading image.

DISCLOSURE OF THE INVENTION

According to an aspect of the present invention, a managing method for a multimedia file includes the steps of: generating index information including a source identifier expressing a source having one or more management units associated with a multimedia file as a title frame, positions of a leading frame and tail frame of the title frame in the source, and a position of a reference frame for decoding the leading frame; and recording said index information onto a recording medium attaching said index information to said multimedia file.

Since index information includes positions of not only a leading frame but also a tail end of a title frame, a series of multimedia data including a plurality of management units can be used as the title frame. In this case, contents of a multimedia file can be identified with ease as compared with a case where only one frame having a specified characteristic is used as the title frame.

According to another aspect of the present invention, a managing method for a multimedia file includes: the steps of; generating index information in which a bit stream obtained by encoding a specified title frame and encoding information indicating a system for the encoding are embedded; and recording the index information onto a recording medium, attaching the index information to the multimedia file.

A bit stream obtained by encoding a specified title frame is embedded in a title frame and attached to a multimedia frame. Hence, even if data of an original title frame is modified or deleted, a title frame can be correctly presented and contents of the file can be identified with ease. This procedure may be combined with the first managing method for a multimedia file described above. In that case, a flag indicating a kind of information contained in index information is set to the index information.

The step of generating index information preferably includes a step of generating a plurality of pieces of index information and the recording step includes a step of recording the plurality of pieces of index information and information for specifying the number of the pieces of index information onto a recording medium, attaching the plurality of pieces of index information and the information for specifying the number of the plurality of pieces of the index information to the multimedia file.

Since a plurality of pieces of index information can be linked to a multimedia file, contents of the file can be expressed in a variety of ways, thereby enabling determination of contents of the multimedia file with more ease.

According to still another aspect of the present invention, a managing apparatus for a multimedia file includes: an index information generating section generating index information including a source identifier expressing a source having one or more management units associated with the multimedia file as a title frame, positions of a leading frame and tail frame of the title frame in the source and a position of a reference frame for decoding the leading frame; and an index information linking section recording the index information onto a recording medium, attaching the index information to the multimedia file.

Since index information includes positions of not only a leading frame but also a tail end of a title frame, a series of multimedia data including a plurality of management units can be used as a title frame. In this case, contents of the multimedia file can be identified with ease as compared with a case where only one frame having a specified characteristic is used as the title frame.

According to yet another aspect of the present invention, a managing apparatus for a multimedia file includes: a frame specifying section; an index information generating section generating index information in which a bit stream obtained by encoding an extracted title frame and encoding information indicating a system for the encoding are embedded; and an index information attaching section recording the index information onto a recording medium, attaching the index information to the multimedia file.

A bit stream obtained by encoding a specified title frame is embedded in a title frame and attached to a multimedia file. Hence, even if data of an original title frame is modified or deleted, the title frame can be correctly presented and contents of the file can be identified with ease. This procedure may be combined with the first managing apparatus for a multimedia file described above. In that case, a flag indicating a kind of information contained in index information is set to the index information.

It is preferable that the index information generating section generates a plurality of pieces of index information and the index information attaching section records a plurality of pieces of index information and information for specifying the number of the index information onto a recording medium, attaching the plurality of pieces of index information and the information for specifying the number of the index information pieces to a multimedia file.

Since a plurality of pieces of index information are attached to a multimedia file, contents of the file can be expressed in a variety of ways, thereby enabling determination of contents of the multimedia file with more ease.

BEST MODES FOR CARRYING OUT THE INVENTION

In the following descriptions, the term "multimedia data" means any data including a character, a picture, voice, sound, a graphic, a video image and others. Furthermore, in the following descriptions as well, when the term "to input NULL into a field" is used, the term means that an input value into the field is not specifically defined and at the time, a NULL code is stored into the field. As a NULL code, either all zeros in a binary notation as a general practice or alternatively a specified value defined in advance of operation may be used.

While the following description will be given mainly of an image file, the invention is applicable to not only an image file, but also general multimedia data such as including voice and a graphic and entire data having a unit manageable in a general way such as a frame, GOP, a macro block and a slice.

The term "I frame" means a frame constituted of an I picture (Intra-coded picture) obtained by encoding one frame of an image to be encoded, regarding the one frame as a still picture in MPEG, as described above. The term "P frame" means a frame constituted of a P picture obtained by encoding based on prediction from one frame at a previous time of the frame of interest. The term "B frame" means a frame constituted of a B picture (bidirectionally predictive picture) obtained by encoding through interpolation on I frames or P frames at subsequent and previous times of the frame of interest. The abbreviation "GOP" (Group of pictures) means a group of images including an I frame, a P frame and a B frame combined, described above.

The term "macro block" (MB) generally means a matrix of 16×16 pixels. A macro block is used in a temporal information compression (interframe prediction) by motion compensation.

The term "slice" is a band of a macro block of an arbitrary length. Note that one slice cannot extend over two or more pictures.

Figure 1:
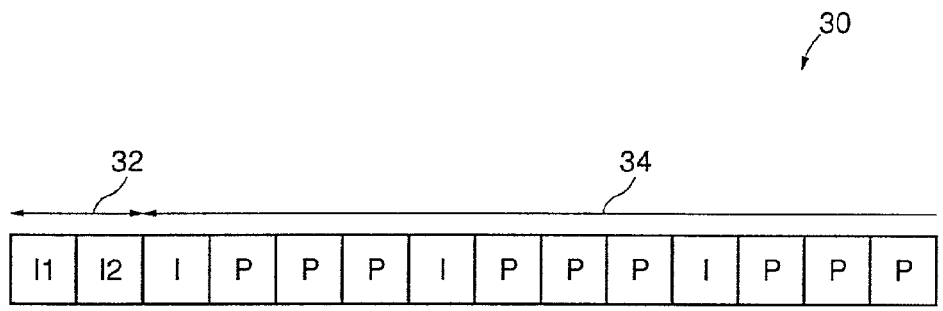
FIG. 1 shows an example structure of an image file in the prior art.
Figure 2:
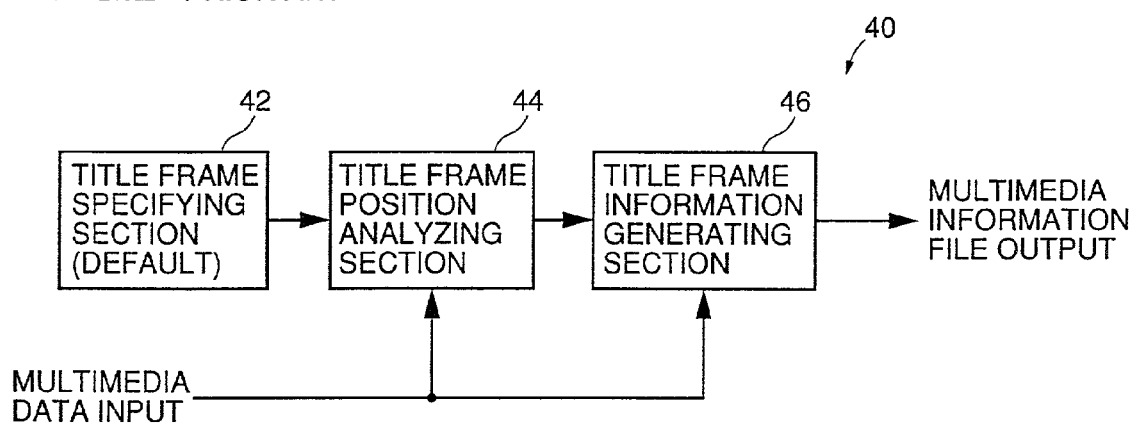
FIG. 2 is a diagram showing a configuration for outputting an image file in the prior art.
Figure 3:
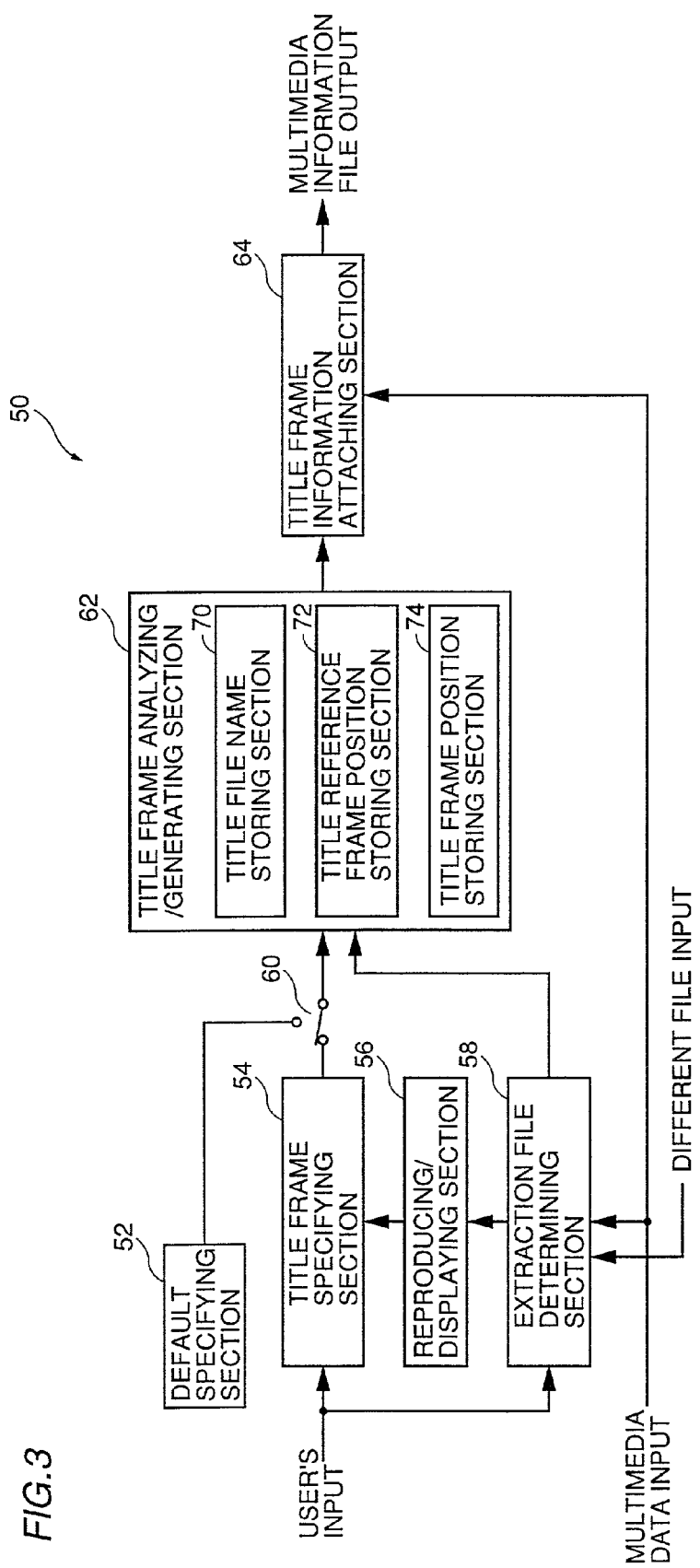
FIG. 3 is a block diagram of an apparatus of a first embodiment of the present invention.

Referring FIG. 3, an image managing apparatus 50 according to the first embodiment of the present invention is an apparatus for outputting a multimedia information file with a management heading attached using multimedia data to be processed as an input. The image managing apparatus 50 includes: an extraction file determining section 58 selecting a file including an image as a title frame (a heading image) according to an input of a user; a reproducing/displaying section 56 reproducing/displaying contents of a file determined by the extraction file determining section 58; a title frame specifying section 54 specifying a part that is to be a title frame in an image file displayed by the reproducing/displaying section 56 according to a user's operation; a default specifying section 52 specifying a title frame according to a default method registered in advance of operation; a default/specification switching section 60 selecting an output of the title frame specifying section 54 when an input from a user exists, or an output of the default specifying section 52 when no input from a user exists; a title frame analyzing/generating section 62 analyzing information outputted from the default/specification switching section 60 to output a file name containing a specified title frame, a position of an I frame in the specified file necessary for correctly restoring a frame at a start position of the specified title frame in the specified file, and a start position and a start position and a finish position of the specified title frame; and a title frame information attaching section 64 attaching a title file name, a position of a title reference frame, start and finish positions of a title frame outputted by the title frame analyzing/generating section 62 to multimedia data as a management heading. Note that when a user specifies no extraction file to be obtained by use of the extraction file determining section 58, multimedia data itself to be processed is specified as an extraction file as the case of default.

The title frame analyzing/generating section 62 includes a title file name storing section 70 analyzing information outputted from the default/specification switching section 60 to extract and store a file name containing a specified title name, and further output the file name to the title frame information attaching section 64; a title frame position storing section 72 analyzing information outputted from the default/specification switching section 60 to determine and store a position of an I frame in a specified file necessary for correctly restoring a frame at a start position of a specified frame in the specified file and further output the position of an I frame to the title frame information attaching section 64; and a title frame position storing section 74 analyzing information outputted from the default/specification switching section 60 to determine start and finish positions of a specified title frame in a specified file and output the determination results to the title frame information attaching section 64. What the title file name storing section 70 extracts is not limited to a file name of a local file, but may be any of information for use in specifying a source from which a title image is extracted such as a file identifier, a file number, a leading end address of a file, a file name containing a network path, all of which are in a system; and in addition an IP address on a network connected using TCP/IP (Transfer Control Protocol/Internet Protocol), and URL (Uniform Resource Locator) on the Internet, singly or in combination.

Figure 4:
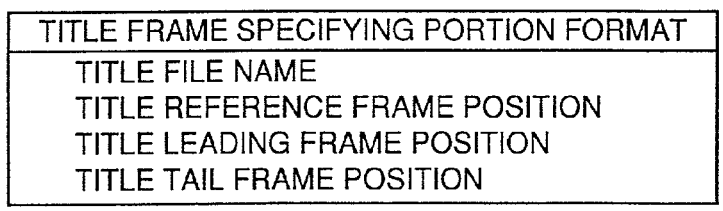
FIG. 4 is a representation showing a format of a title frame specifying portion in the first embodiment of the invention of the present application.

Referring to FIG. 4, a title frame specifying portion linked by the image managing section 50 includes: a title file name specifying a file containing a title frame; a title reference frame position specifying a position of an I frame, necessary for correctly restoring a title image, in a file specified by a title name; a position of a title leading frame indicating a position of a leading frame, of one or more frames constituting a title image, in a file specified by a title name; and likewise, a position of a title tail frame indicating the position of a tail frame. Note that while in this embodiment, the title frame specifying portion is stored in a header attached to the leading end of multimedia data, the output is not only located at the leading end of multimedia data but may also be disposed at any location thereof.

The term "title file name" is a value extracted and outputted by the title file name storing section 70. In a case where a NULL is stored here, the file of interest can be specified as a default.

A position of a title reference frame is a value extracted and outputted by the title reference frame position storing section 72. The title reference frame position is data indicating an offset position relative to the file leading end, of an I frame at which decoding is started, required for correctly restoring a title frame when the title frame is restored and displayed. If the leading frame of a title frame is an I frame, a title reference frame position coincides with the leading position of the title frame. If the leading frame of the title frame is not an I frame, the title reference frame position is a position of an I frame required for correctly decoding the title frame, that is a position of an I frame among I frames present ahead of the leading frame of the title frame, closest to the leading frame.

A title leading frame position and a title tail frame position are data extracted and outputted by a title frame position storing section 74 and indicate positions of the leading frame and the tail frame, respectively, among one or more frames, serving as a title frame, in a file specified by a title name. Note that in this embodiment, a title frame position is an offset from a title leading frame position. The title tail frame position is an offset from the title leading frame position. Note that the above described frame positions can be expressed as differentials from an arbitrary position in a file as a reference. Furthermore, if physical positions of frames on a medium on which a multimedia information file is finally recorded are known, the frame positions may be specified with the respective physical positions.

In addition, the leading and tail end positions of a title are here specified using a frame position. However, a position of a title image may be specified using a unit larger than a frame, for example, a GOP in MPEG. Alternatively, a position of a title image may be specified using a unit smaller than a frame, for example, a slice or a macro block. By enabling specification of a title image with a unit larger than a frame, an information amount (region) necessary for specifying a title image is reduced and frames can be managed using a series of pictures to be subjected to special reproduction as a unit. Alternatively, by enabling specification of a title image using a unit small than a frame, a title image smaller than a display size can be specified.

According to the invention, by specifying a title image using both of a leading frame position and a tail frame position as described above, not only a still picture but also a moving picture can be used as a title image.

The image managing apparatus 50 shown in FIG. 3 operates as follows. First, multimedia data is inputted to this apparatus. A user inputs which file of an image is to be specified as a title image, using the extraction file determining section 58. The reproducing/displaying section 56 reproduces/displays the specified file according to the file information outputted by the extraction file determining section 58. The user specifies which part of a displayed image is used as a title image, using the title frame specifying section 54. This information is provided to the default/specification switching section 60.

The default/specification switching section 60 selectively provides an output of the title frame specifying section 54 to the title frame analyzing/generating section 62 when a user's input by the title frame specifying section 54 exists, while selectively providing an output of the default specifying section 52 thereto when no user's input exists.

The title file name storing section 70 extracts a title file name from input information and stores and outputs the title file name to the title frame information attaching section 64. The title reference frame position storing section 72 extracts a title reference frame position from input information and stores and outputs the position to the title frame information attaching section 64. The title frame position storing section 74 extracts a title frame position (a start frame position and a tail frame position) from input information and stores and outputs the position to the title frame information attaching section 64.

The title frame information attaching section 64 prepares a management heading according to a title frame specifying portion format shown in FIG. 4 based on the title file name, the title reference frame position and the title frame position outputted from the title file name storing section 70, the title reference frame position storing section 72 and the title frame position storing section 74, respectively, to attach the management heading to the leading end of input multimedia data as a header and output the management heading in a multimedia information file.

Next, description will be given of a format of a multimedia information file having the above described title frame specifying portion and data handling when a title image is displayed based on contents of the file.

Figure 5:
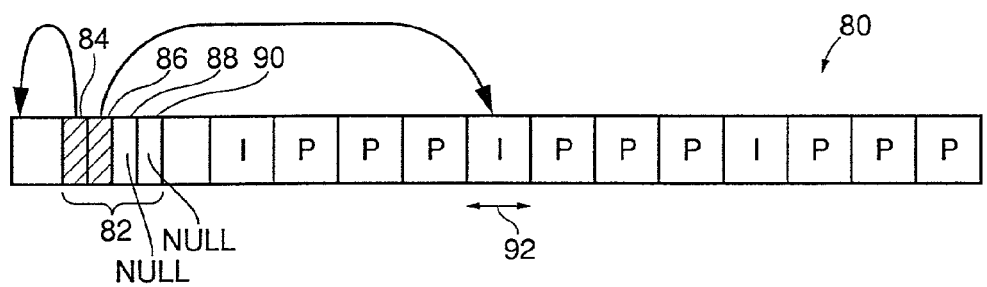
FIG. 5 is a representation schematically showing a process of extracting a title image from a multimedia information file when an I frame is used as a still picture title.

FIG. 5 shows contents of a multimedia information file when one I frame contained in inputted multimedia data is used as a title frame. Referring to FIG. 5, the multimedia information file 80 includes a title frame specifying portion 82 as image heading information.

The title frame specifying portion 82 includes: a file name 84; a title reference frame position 86; a title leading frame position 88; and a title tail frame position 90. Contents of those constituents are described above. In the example shown in FIG. 5, a file name of the multimedia information file 80 itself is stored in the file name 84. Information indicating a position of an I frame 92, which is the fifth frame, is stored in the title reference frame position 86. NULLs are stored in the title leading frame position 88 and the title tail frame position 90.

In this case, a still picture constituted of the I frame 92 in the multimedia information file 80 is specified as a title image. Note that when NULL is stored in the file name 84, it may be construed that a file of interest is specified. When NULL is stored in the title leading frame position 88, it is construed that the title leading frame position is the same as the title reference frame position. Furthermore, since data (NULL) indicating being the same as the title leading frame position 88 is stored in the title tail frame position 90, it is construed that a title image is a still picture.

Figure 6:
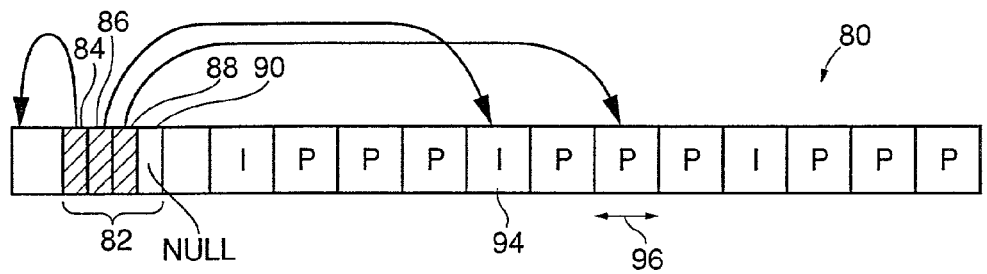
FIG. 6 schematically shows a process of extracting a title image from a multimedia information file when a P frame is used as a still picture title.

FIG. 6 shows an example in which a title image is one non-I frame (P frame 96) of the multimedia information file 80 itself. A file name of the multimedia information file 80 is stored in the file name 84. A position of the last I frame 94 among I frames preceding the P frame 96 is stored in the title reference frame position 86. An offset from the I frame 94 to the P frame 96 is stored in the title leading frame position 88. In the example of FIG. 6, the title reference frame position 86 stores "5" and the title leading frame position 88 stores "2". Since a title image is a still picture, NULL is stored in the title tail frame position 90. Note that the same data as the title leading frame position 88 may be stored in the title tail frame position 90.

Figure 7:
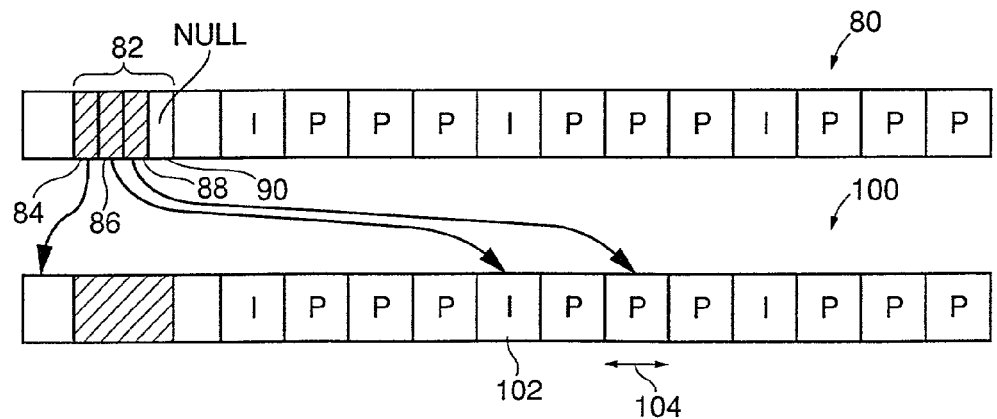
FIG. 7 schematically shows a process of extracting a title image from a multimedia information file when a P frame included in a different file is used as a still picture title.

FIG. 7 shows a case where a title frame of the multimedia information file 80 is a P frame 104 included in a multimedia information file 100. In this example, the file name 84 stores a file name of the multimedia information file 100. The title reference frame position 86 stores a position of an I frame 102 in the multimedia information file 100. The title leading frame position 88 stores an offset of the P frame 104 from the I frame 102. The title tail frame position 90 stores NULL.

Figure 8:
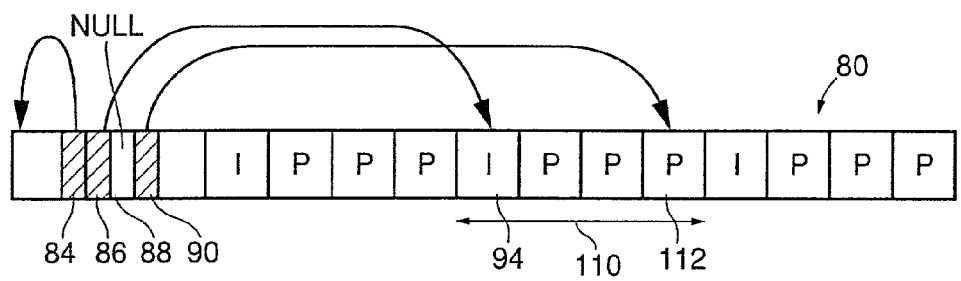
FIG. 8 schematically shows a process of extracting a title image from a multimedia information file when a plurality of frames having an I frame as a leading frame are used as a moving picture title.

FIG. 8 shows a case where a moving picture 110 constituted of a plurality of frames starting at the I frame 94 and ending at a P frame 112 of the multimedia information file 80 itself is used as a title image. The file name 84 stores a file name of the multimedia information file 80 itself. The title reference frame position 86 stores a position of the I frame 94. Since the title leading frame is the I frame 94, NULL is stored in the title leading frame position 88. A position of the P frame 112 (an offset from the I frame 94) is stored in the title tail frame position 90. In this example, "3" is stored in the title tail frame position 90.

Figure 9:
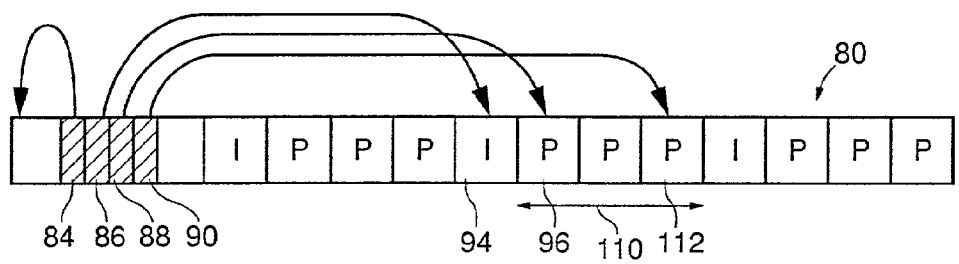
FIG. 9 schematically shows a process of extracting a title image from a multimedia information file when a plurality of frames having a P frame as a leading frame are used as a moving picture title.

FIG. 9 shows a case where a moving picture 110 constituted of a plurality of frames starting at the P frame 96 and ending at the P frame 112 of the multimedia information file 80 itself is used as a title image. The file name 84 stores a file name of the multimedia information file 80 itself. The title reference frame position 86 stores a position of the I frame 94, which is the last one among I frames preceding the P frame 96. The title leading frame position 88 stores an offset from the I frame 94 to the P frame 96. In the example shown in FIG. 9, "1" is stored in the title leading frame position 88. The title tail frame position 90 stores an offset from a position of the P frame 96 to a position of the P frame 112. In the example shown in FIG. 9, "2" is stored in the title tail frame position 90.

Figure 10:
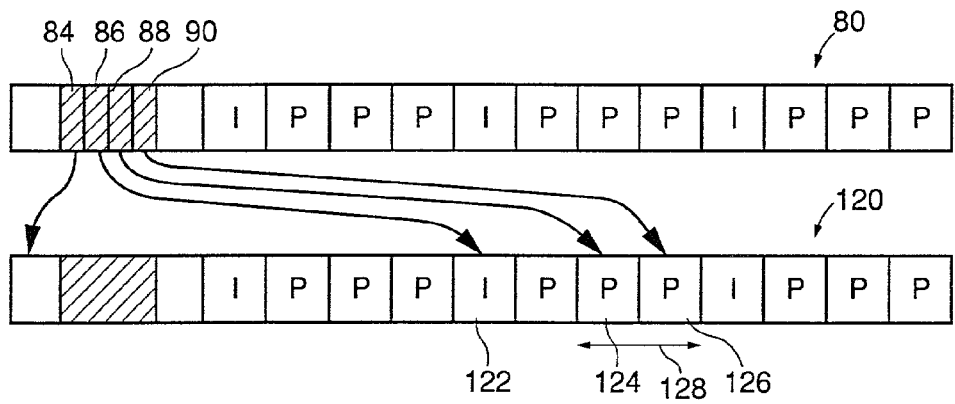
FIG. 10 schematically shows a process of extracting a title image from a multimedia information file when a plurality of frames having a P frame as a leading frame, included in a different file, are used as a moving picture title.

FIG. 10 shows a case where a moving picture 128 constituted of two frames, P frame 124 and P frame 126, included in a multimedia information file 120 different from the multimedia information file 80 is a title image of the multimedia information file 80. The file name 84 stores a file name of a multimedia information file 120. The title reference frame position 86 stores a position of an I frame 122, which is the last one among I frames preceding the P frame 124 in the multimedia information file 120. The title leading frame position 88 stores an offset from the I frame 122 to the P frame 124, "2" in the example shown in FIG. 10. The title tail frame position 90 stores an offset from the P frame 124 to the P frame 126, "1" in the example shown in FIG. 10.

Figure 11:
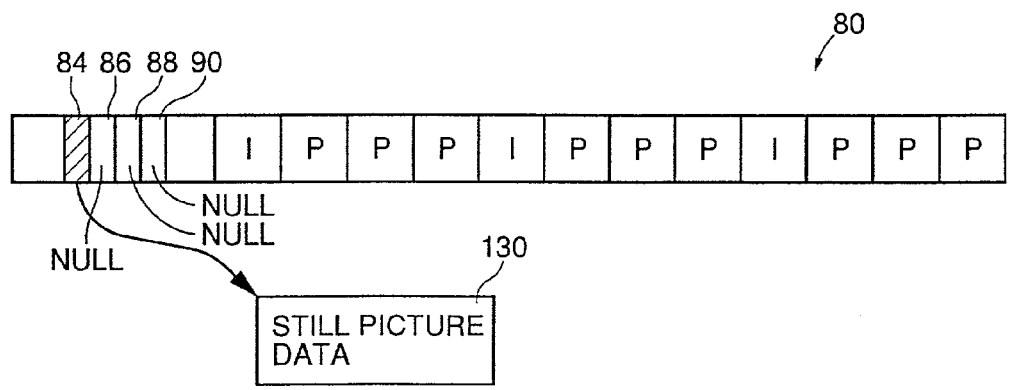
FIG. 11 schematically shows a process of extracting a title image from a multimedia information file when still picture data, in a different file, is to be a still picture title.

FIG. 11 shows a case where a file 130 different from the multimedia information file 80 is a title image. It is assumed that the file 130 is a still picture file. The file name 84 stores a file name of the file 130. The tile reference frame position 86, the title leading frame position 88 and the title tail frame position 90 all stores NULL.

In the example shown in FIG. 11, while the file 130 is a still picture file, it may be a moving picture file. In a case where information as in FIG. 11 is stored in from the file name 84 to the title tail frame position 90, all of the moving picture from the first to the last frames are specified as a title image.

Description will be given in the following, of a method in which a title image is restored based on a title frame specifying portion of the above described format. Since if an image to be finally restored is determined as a still picture or a moving picture, a method for reproducing/restoring the picture is obvious for a person skilled in the art, detailed description thereof is not given here for clarity reason.

Figure 12:
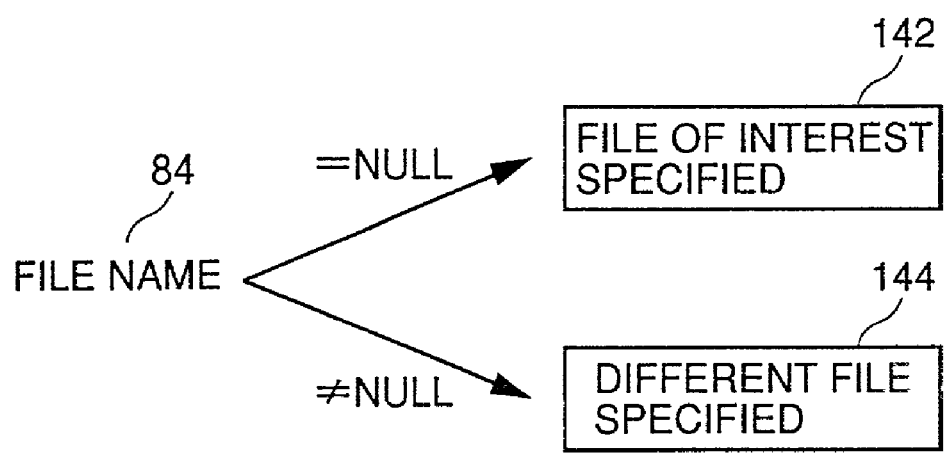
FIG. 12 schematically shows a process of selecting a file based on a file name field.

Referring to FIG. 12, it is determined whether or not contents of the file name 84 is NULL. If the file name 84 is NULL, a file of interest is specified (142), else a different file is specified (144). Needless to say, when a file name of the file of interest is stored in the file name 84, the file of interest is also specified.

Figure 13:
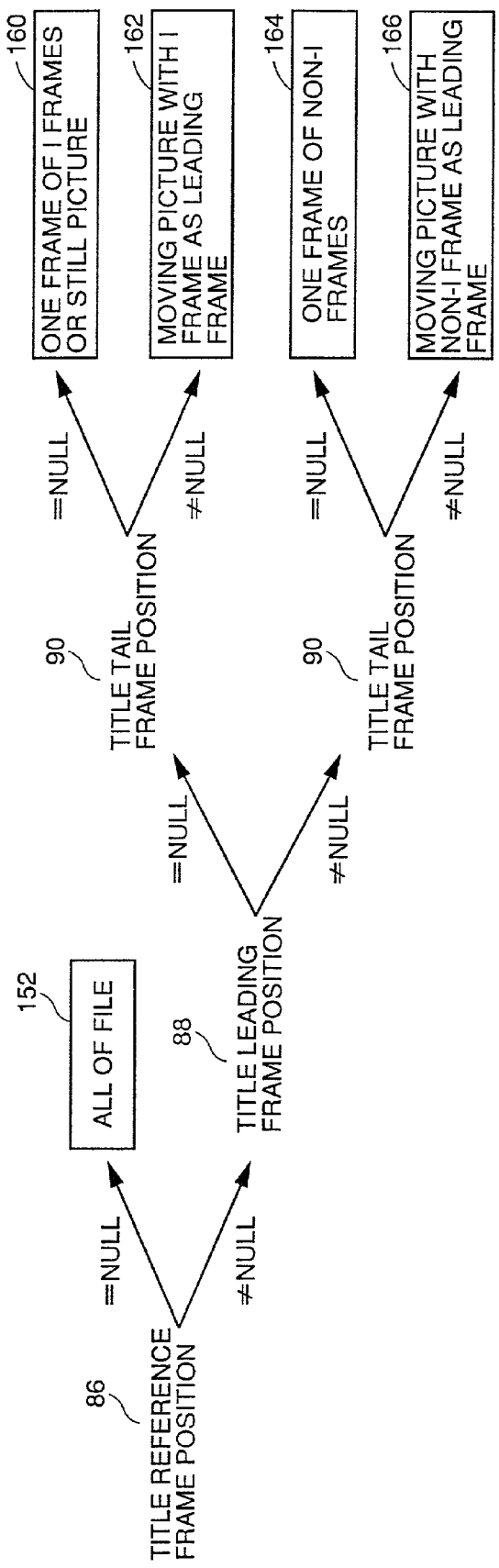
FIG. 13 schematically shows a process of determining a title frame position based on a variety of pieces of information in a header.

Referring to FIG. 13, it is next determined whether or not the title reference frame position 86 is NULL. If the title reference frame position 86 is NULL, it is construed that all of a file specified by the file name 84 is specified (152), else it is determined whether or not contents of the title leading frame position 88 are NULL.

In a case where the contents of the title leading frame position 88 is NULL, it indicates that the title leading frame position 88 is the same as the title reference frame position 86. That is, it means that the frame of the title leading frame position 88 is an I frame. In this case, it is next determined whether or not contents of the title tail frame position 90 is NULL. If the contents of the title tail frame position 90 are NULL, it is construed that the title leading frame position 88 and the title tail frame position 90 are the same. One frame of I frames specified by the title reference frame location 86 or a still picture thereof is specified as a title image. In a case where contents of the title tail frame position 90 are not NULL, a moving picture with an I frame specified by the title reference frame position 86 as a leading frame and including the following frames the last one of which is specified by the title tail frame position 90 is specified as a title image.

In a case where contents of the title leading frame position 88 are not NULL, it means that the title leading frame is not an I frame (is a non-I frame). In this case as well, it is determined whether or not contents of the title tail frame position 90 are NULL. If the title tail frame position 90 is NULL, it is construed that one frame of non-I frames specified by the title leading frame position 88 is specified as a title image (164), else, a moving picture with a non-I frame indicated by the title leading frame position 88 as a leading frame and including the following series of frames the last one of which is indicated by the title tail frame position 90 is specified as a title image.

Note that in the above presented description, by storing NULL in a field, it is shown that there is no information in the field (the information is the same as that of another field). However, the present invention is not limited to such an implementation. For example, a flag indicating whether or not each field exists may be provided to a title frame specifying portion for the each field. In this case, if data to be stored in a region is NULL, a flag is set to a value indicating "nothing" and a corresponding region is designed not to be provided. By doing so, since no region in which a frame position is to be stored is required, a data storing region can be effectively utilized.

Figure 14:
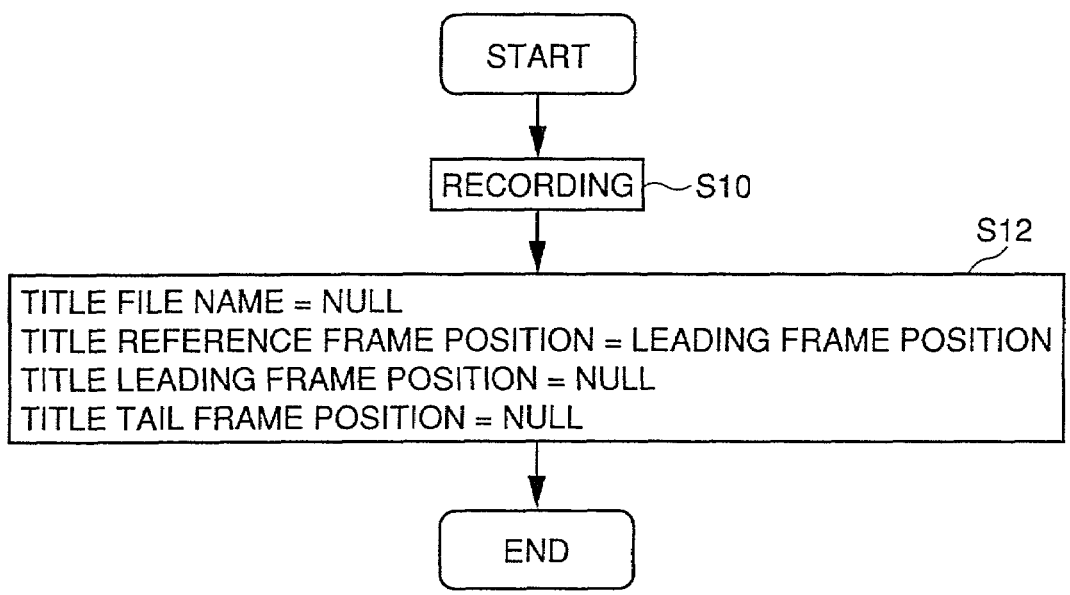
FIG. 14 is a flow chart showing a process for preparing title frame information when recording a moving picture.

Next, description will be given of a flow of process for preparing title frame information with the above described structure with reference to FIGS. 14 and 15. FIG. 14 is a flow of a process for preparing title frame information when a title frame is specified using a default value. Typically, this process is performed when an image is first prepared.

In this example, it is assumed that one leading I frame of a file of interest is specified as a title frame due to reflection of a default value. When multimedia data is first recorded as an image, a system can be set such that one leading frame of a file of interest is automatically used as a title frame in this way.

When recording gets started (step S10), information according to setting of default is stored in elements of a title frame specifying portion residing in a header portion of a multimedia information file. Herein, a name of the file of interest is stored in a title file name. Information indicating a position of a leading frame of the multimedia information file is stored in a title reference frame position. Note that it is here assumed that the leading frame is an I frame at all times. Nulls are stored in the title leading frame position and the title tail frame position. By doing so, one frame (frame) at the leading position of the file of interest automatically serves as a title frame of this multimedia information file.

Figure 15:
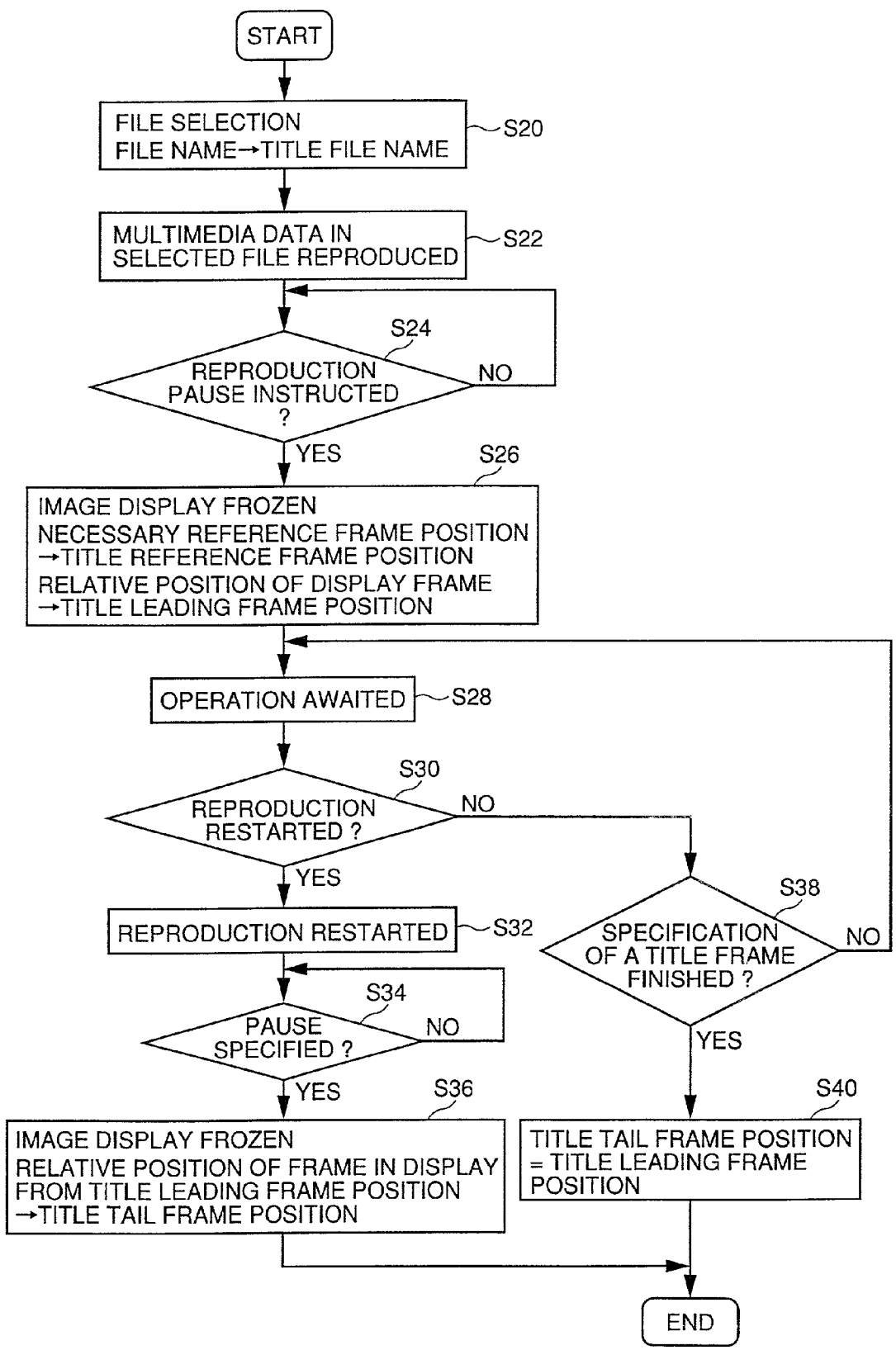
FIG. 15 is a flow chart showing a process for preparing title frame information for a moving picture recorded already.

Referring to FIG. 15, when a user sets an arbitrary image as a title frame of a multimedia information file, a file including a title frame is selected in step S20. Herein, any of the multimedia files itself or a different file can be selected. It is assumed that when there is no input, the file of interest is selected as default. In a case where a selected file is a still picture file, though not shown, NULLs are stored at this time point in a title reference frame position, a title reference frame position, a title leading frame position and a title tail frame position of a title frame specifying portion, which terminates the process.

Then, multimedia data in a selected multimedia information file is reproduced (step S22). During this reproduction, it is constantly managed whether or not a frame in display is an I frame and which frame is an I frame displayed at a previous time. In such a way, it is constantly determined whether or not a reproduction pause is instructed by a user during reproduction (step S24) and when an instruction of a reproduction pause is issued, the control goes to step S26.

In step 26, an image in display is frozen. That is, an image displayed at that time point stops its motion and is presented like a still picture. Information on the frame in display is stored in the title reference frame position and the title leading frame position. At this time point, if the frame in display is an I frame, a position of the frame is stored in the title reference frame position and NULL is stored in the title leading frame position. If the frame in display is not an I frame, a position of an I frame (typically, the last I frame preceding the frame in display) required for displaying the frame in display is stored in the title reference frame position and an offset from the last I frame to a position of the frame in display is stored in the title leading frame position.

Next, the apparatus awaits a user's operation (step S28). More specifically, at this time, the user specifies restart of reproduction, or terminates specification of a title frame.

In step S30, it is determined whether or not a user's specified restart of reproduction. If the operation specifies the restart of reproduction, reproduction of multimedia data is restarted in step S32 from the state at a time point at which the reproduction was stopped at a previous time. It is constantly monitored by the user whether or not a pause is specified during the reproduction (step S34) and if the pause is specified, the control goes to step S36.

In step S36, an image currently in display is frozen again and an offset between a position of the frame in display and a position of a title leading frame is stored in the title tail frame position.

Meanwhile, if it is determined that the user does not instruct restart of reproduction in step S30, it is further determined in step S38 whether or not a user's operation is one instructing termination of specification of a title frame. If the user does not instruct to terminate specifying of a title frame, the control returns to step S28 to repeat the above described process. If a user's operation is one instructing specification of a title frame, a value (NULL) indicating that the title tail frame position is the same as the title leading frame position is stored in the title tail frame position in step S40.

According to the above described process, pieces of information of the title frame specifying portion are set. Title frame information prepared by the processing is provided to an image file. The title frame information may be attached to either the leading end or the tail end. Furthermore, it is also allowed that the title frame information is a title frame information file different from the image file and the title frame information file and the image file are linked to each other. In this case, a special rule may be provided between the image file and the title frame information file using a file identifier or the like.

In this way, by attaching or relating title frame information of the image file to the image file, contents of the image file can be displayed so as to be easily understood. For example, by automatically reproducing/displaying title frame information provided to the image file at the time point when a recording medium on which the image file is recorded is inserted into a reproducing apparatus, the user can immediately identify contents of the image file. Furthermore, display of the title frame is not automatically effected but may be started by a user's instruction.

Figure 16:
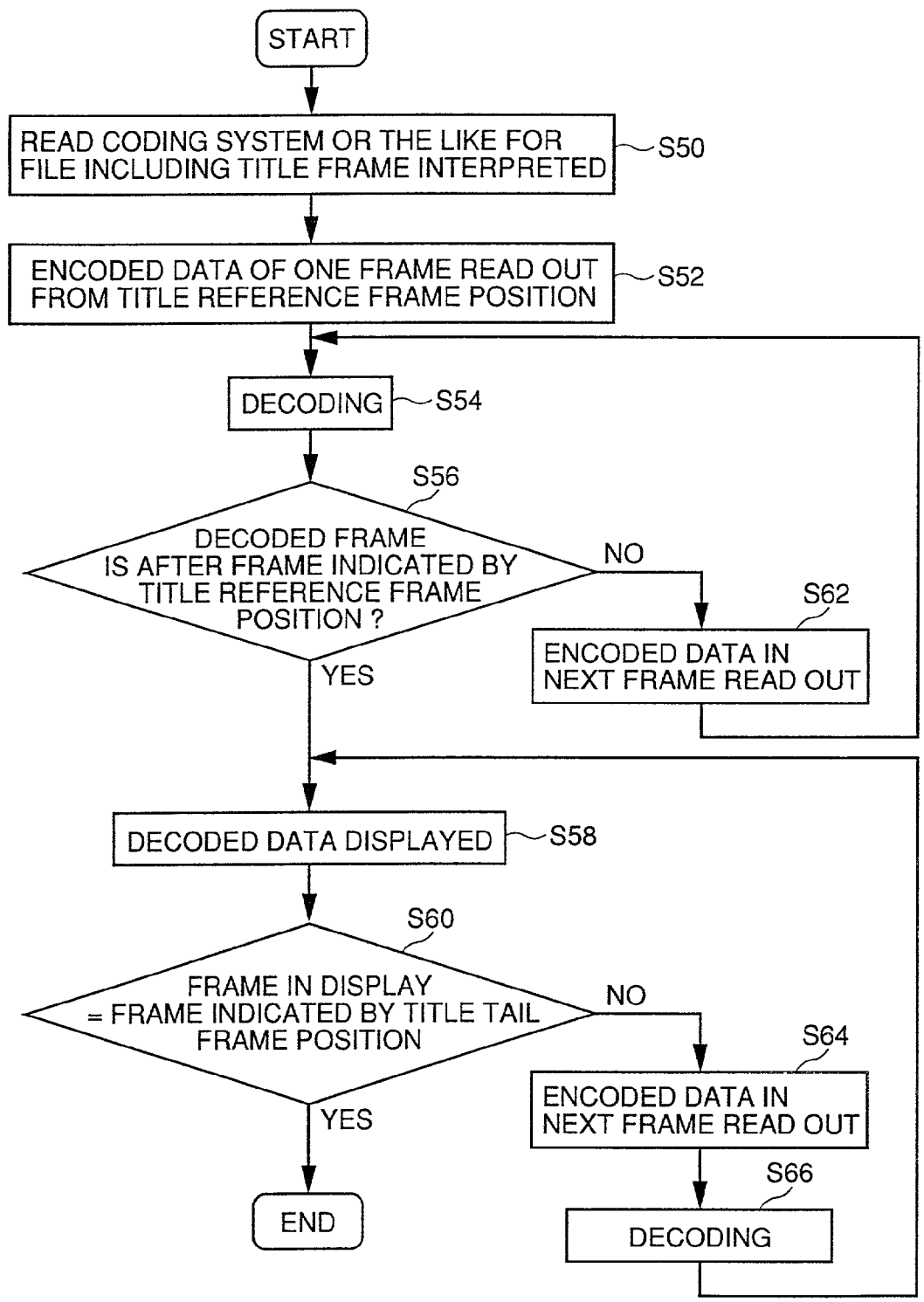
FIG. 16 is a flow chart showing a process for decoding and displaying a title frame.

Referring to FIG. 16, decoding and displaying of a title frame are performed in the following way: When reproduction of a title frame is started, a file containing the title frame is read out according to the file name 84 (step S50). This file may be either a file of interest or a different file. Here, it is determined what a coding system of a read-out file is.

Next, encoded data of an I frame indicated by the title reference frame position 86 is read out (step S52). The encoded data is decoded (step S54). Then, it is determined whether or not the decoded frame is after the frame indicated by the title reference frame position 86 in the order of position (step S56). If a determination result is "NO," encoded data in the next frame is read out (step S62), the control returns to step S54. By doing so, data are progressively read out up to the frame indicated by the title reference frame position 86. If a determination result in step S56 is "YES," decoded data is displayed (step S58).

In succession, it is determined in step S60 whether or not a frame in display is a frame indicated by the title tail frame position 90. If a determination result is "NO," the control goes to step S64. Data in the next frame is read out in step S64 and successively decoded (step S66). Subsequent to this, the control returns to step S58 and thereafter, frames including a frame indicated by the title tail frame position 90 at the last place are sequentially reproduced/displayed. If a determination result in step S60 is "YES," the process is terminated.

Note that though not shown, if a file specified by the file name 84 is a still picture file, it is found immediately when the file is read out (step S50), therefore, an image has only to be decoded and displayed.

According to this embodiment, as described above, the following process can be effected such that title frame information is provided to a multimedia information file, and a still picture or a moving picture in multimedia information thereof, or a still picture or a moving picture of a different file can be decoded/displayed as a title image expressing contents of the multimedia information file according to the title frame information. Hence, any user can understand contents of a file with ease.

In the first embodiment described above, a still picture or a series of moving pictures can be specified as a title frame. It is convenient, however, that not only one still picture or a series of moving pictures, but also a plurality of still pictures or a plurality of moving picture sequences can be specified as a title frame, if possible.

Moreover, in the first embodiment, only information on a position of a title frame is stored in title frame information. In this case, for example, if a different file is deleted or moved into a different place after the different file is specified, there is a risk that the title frame cannot be read out.

In a second embodiment described below, such a problem is considered: A plurality of still pictures or a plurality of moving picture sequences can be specified as a title frame and in addition, even when a different file is specified as a title frame and the different file is deleted, the title frame can be decoded without causing any problem. To be brief, in an apparatus of the second embodiment, the above described problems are solved by enabling provision of a plurality of parts each corresponding to the management heading 32 of the first embodiment and storage of an image data itself constituting a corresponding title frame in the parts each corresponding to the management heading 32.

Figure 17:
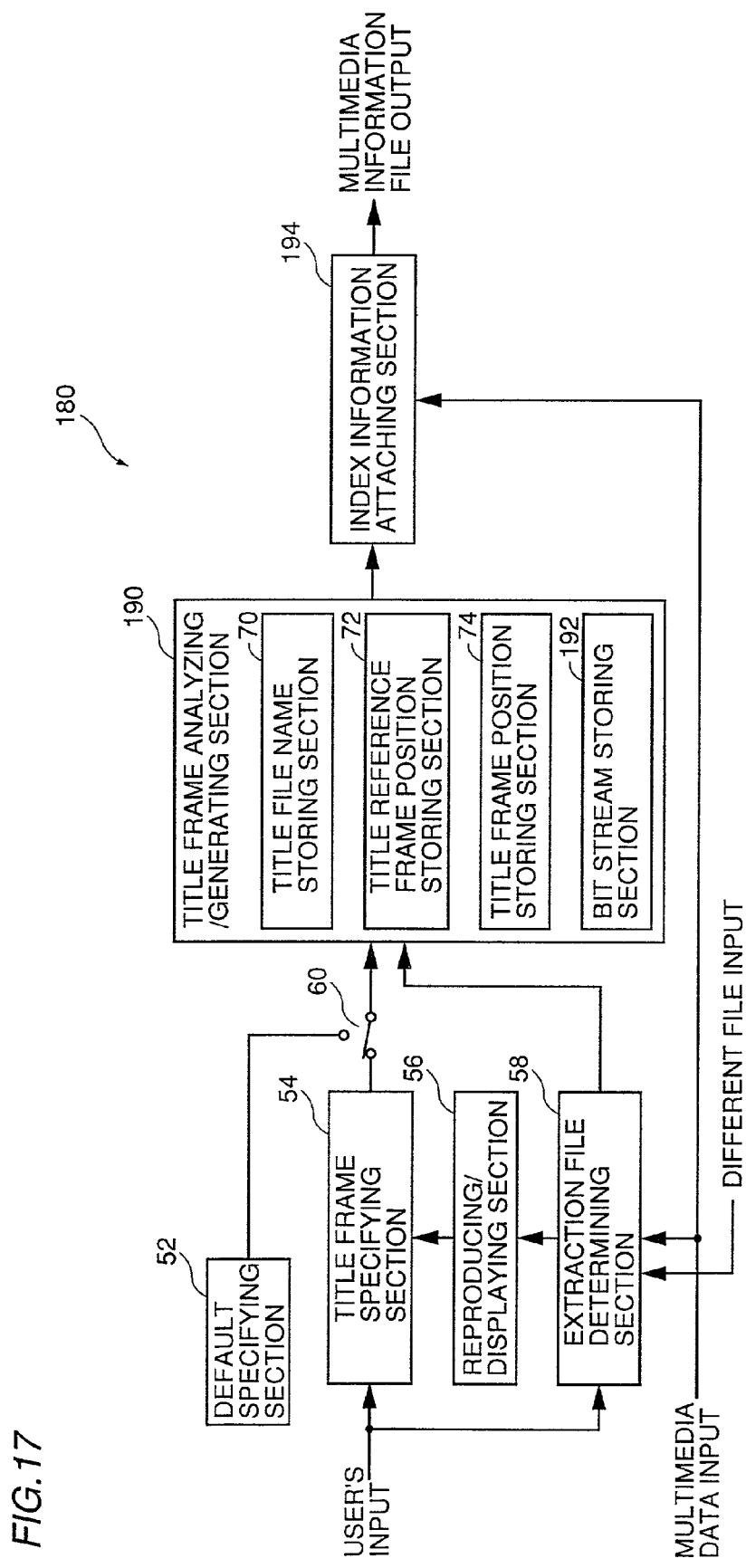
FIG. 17 is a block diagram of an apparatus of a second embodiment of the invention of the present application.

Referring to FIG. 17, an image managing apparatus 180 according to the second embodiment is different from the image managing apparatus 50 of the first embodiment shown in FIG. 3 in that it includes a title frame analyzing/generating section 190 including a title file name storing section 70; a title reference frame position storing section 72; and a title frame position storing section 74, as well as: a bit stream storing section 192 extracting a bit stream constituting a title image from a file from which a title is extracted and encoding the bit stream to store and output the encoded bit stream instead of the title frame analyzing/generating section 62 of FIG. 3; and that an index information attaching section 194 for storing the bit stream outputted from the bit stream storing section 192 in title frame information to attach the bit stream to a multimedia information file is included instead of the title frame information attaching section 64 of FIG. 3.

The other elements of the image managing apparatus 180 are the same as corresponding elements of the image managing device 50 shown in FIG. 3. The corresponding elements are labeled with the same reference numerals. Their names and functions are the same in FIGS. 3 and 17. Hence, detailed description thereof is not repeated here.

A bit stream extracted/stored by the bit steam storing section 192 may be any of the following: all of specified files, all of data obtained by decoding all data included in a specified file, data obtained by re-encoding part or all of a specified file according to a different encoding mode and part of data of the user.

Figures 18, 19:
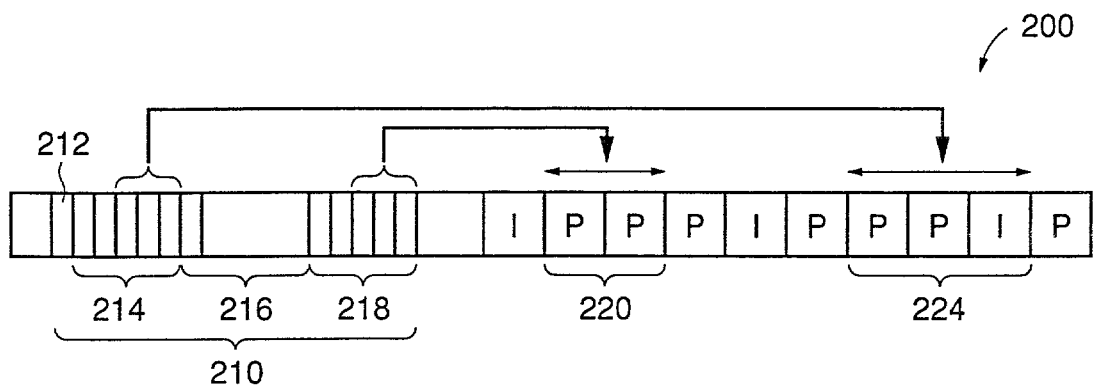
FIG. 18 schematically shows a title frame image used in the second embodiment.
FIG. 19 is a representation showing an example structure of a multimedia information file and a process of extracting a title image based on header information.

FIG. 18 shows a format of a title frame specifying portion of a multimedia information file of the second embodiment. The title frame specifying portion includes the number of title elements. The number of title elements indicates the number of title frames specified by the title frame specifying portion.

The number of title elements are followed by the same number of pieces of title frame specifying information.

Title frame specifying information includes; a reference/embedding flag indicating whether the title frame specifying information is constituted of information for referring to a title frame, or the title frame itself embedded in the title frame specifying information; and title frame information whose contents are different according to a value of the reference/embedding flag.

When a reference/embedding flag is of a value indicating "reference," a title frame information, as in the case of the first embodiment includes: a title name; a title reference frame position; a title leading frame position; and a title tail frame position. When a reference/embedding flag is of a value indicating "embedding," a title frame information includes: a embedding length indicating a length of a title frame embedded in the title frame information; a coding system information specifying a coding system of an embedded title frame; and a bit stream constituting a title frame itself.

Figure 20:
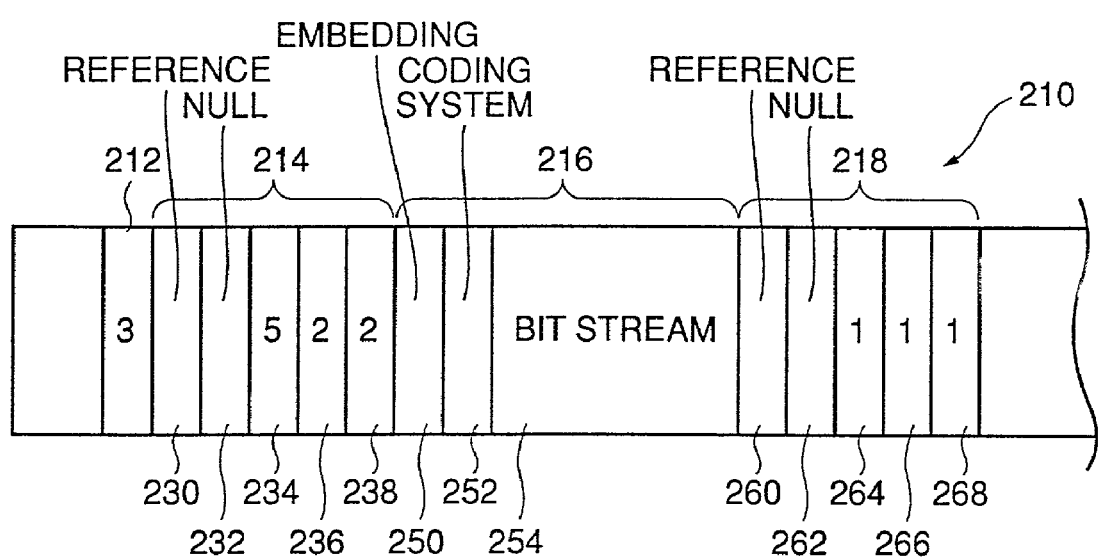
FIG. 20 is a more detailed representation showing a header of the multimedia information file shown in FIG. 19.

FIGS. 19 and 20 show an example structure of a multimedia information file according to the second embodiment. Referring to FIGS. 19 and 20, the multimedia information file 200 includes: a title frame specifying portion 210; and a multimedia data constituted of I frames and P frames.

The title frame specifying portion 210 includes: the number of title elements 212; first title frame information 214; second title frame information 216; and third title frame information 218. In this example, a number "3" is stored in the number of title elements 212 and, according to the number "3", three title frame information parts constituted of the first to third title frame information 214 to 218 are provided. The first title frame information 214 refers to first title frames 224 consisting of two P frames and one I frame. The third title frame information 218 refers to third title frames 220 consisting of two P frames. The second title information 216 includes a title frame embedded therein as described later.

Referring particularly to FIG. 20, the first title information 214 includes: a first reference/embedding flag 230; a first title file name 232; a first title reference frame position 234; a first title leading frame position 236; and a first title tail frame position 238. The first reference/embedding flag 230 stores a value indicating "reference." The first title file name 232 stores NULL. The first title reference frame position 234 stores a position of the second I frame prior to the leading P frame of the first title frame 224. The first title leading frame position 236 stores an offset between the leading P frame of the first title frame 224 and the above described I frame. The first title tail frame position 238 stores an offset from a position of the leading P frame of the first title frame 224 to a position of the last I frame thereof. Contents of the datas are the same as those described in connection with the first embodiment. Hence, detailed description thereof is not repeated here.

The third title frame information 218 as well is similar to the first title frame information 214.

In contrast, the second title frame information 216 includes: a second reference/embedding flag 250; a coding system information 252; and an embedded title frame 254. A value of the second reference/embedding flag 250 is a value expressing "embedding." The coding system information 252 is information specifying a coding system of the embedded title frame 254. The embedded title frame 254 may be either data obtained by re-encoding part of data of the title frame specifying portion 210 itself or data obtained by encoding contents of a different file. The coding system this time is required to coincide with a coding system shown in the coding system information 252.

By preparing the title frame specifying portion 210 in such a format, contents of the title frame specifying portion 210 can be expressed with a plurality of title images. Hence, contents of a multimedia information file is advantageously easier to understand than in the case of the first embodiment. Furthermore, in the second embodiment, a bit stream expressing an image of title frame can be stored in title frame information. Hence, when a different file is specified as a title frame, contents of a multimedia information file can be correctly displayed even if the different file is deleted or moved. Moreover, since a coding system for a bit stream can be specified, an information amount of a title frame can be suppressed small with a coding system having a higher compression ratio even when an original image constituting the title frame is large and thereby, has a large information amount. In this case, a title frame is not necessary to be of a high quality image since it has only to be understood what contents of a multimedia information file are.

According to the present invention, as described above, in a case where a title frame expressing contents of a multimedia file is prepared, even a frame other than an I frame can be specified as a title frame. Furthermore, since not only a still picture, but also a moving picture can be specified as a title frame, contents of a file can be identified with more ease.

Besides, when a plurality of title frames can be specified, contents of a multimedia file can be expressed in a variety of ways; therefore, the contents thereof is understandable with more ease. Moreover, by embedding a bit stream of an image of a title frame in title frame information itself, a different file can be specified as a title frame such that the title frame can be correctly displayed even when the different file is deleted.

INDUSTRIAL APPLICABILITY

According to an image managing apparatus and an image managing method of the invention, as described above, contents of many of multimedia files can be identified with ease by any person using display of a title frame, wherein there is no limitation on a title frame which can be specified. Hence, the image managing apparatus and the image managing method are suitable for file management in many fields in which there is demands for managing multimedia information, such as a private multimedia information file management, medical image file management, file management in broadcasting business and multimedia data file management required for various research fields as an assistant tool for a research.

What is claimed is:

1. A method of managing a multimedia file managing said multimedia file with index information, multimedia data of said multimedia file being able to be managed in each prescribed management unit, including the steps of:
generating said index information including a source identifier expressing a source having one or more of said management units associated with said multimedia file as a title frame, positions of a leading frame and tail frame of said title frame in said source, and a position of a reference frame for decoding said leading frame; and
recording said index information onto a recording medium, attaching said index information to said multimedia file.

2. The managing method for a multimedia file according to claim 1, wherein said step of generating index information includes a step of generating a plurality of pieces of index information and said recording step includes a step of recording said plurality of pieces of index information and information for specifying the number of said pieces of index information onto a recording medium, attaching said plurality of pieces of index information and said information for specifying the number of said pieces of index information to said multimedia file.

3. The managing method for a multimedia file according to claim 1, further including the steps of:
causing a user to specify one or more of management units associated with said multimedia file as a title frame; and
generating second index information in which a bit stream obtained by encoding a specified title frame is embedded;
wherein said recording step including a step of recording said index information and said second index information onto a recording medium together with flags indicating kinds of said index information and said second index information, respectively, attaching said index information and said second index information to said multimedia file together with said flags indicating kinds of said index information and said second index information.

4. A managing apparatus for a multimedia file managing said multimedia file with index information, multimedia data of said multimedia file being able to be managed in each prescribed management unit, including:
an index information generating section generating index information including a source identifier expressing a source having one or more of said management units associated with said multimedia file as a title frame, positions of a leading frame and tail frame of said title frame in said source and a position of a reference frame for decoding said leading frame; and
an index information attaching section recording said index information onto a recording medium, attaching said index information to said multimedia file.

5. The managing apparatus for a multimedia file according to claim 4, wherein said multimedia file is an image file.

6. The managing apparatus for a multimedia file according to claim 5, wherein said prescribed management unit is a frame of an image.

7. The managing apparatus for a multimedia file according to claim 4, wherein said index information generating section generates a plurality of pieces of index information and
said index information attaching section records said plurality of pieces of index information and information for specifying the number of said pieces of index information onto a recording medium, attaching said plurality of pieces of index information pieces and said information for specifying the number of said index information pieces to said multimedia file.

8. The managing apparatus for a multimedia file according to claim 4, wherein said index information generating section generates said index information including said source identifier specifying a title frame having one or more of said management units in said multimedia file, positions of a leading frame and tail frame of said title frame and a position of a reference frame for decoding said leading frame.

9. The managing apparatus for a multimedia file according to claim 4, wherein said index information generating section generates said index information including said source identifier specifying a title frame having one or more of said management units in a second multimedia file different from said multimedia file, positions of a leading frame and tail frame of said title frame and a position of a reference frame for decoding said leading frame.

10. The managing apparatus for a multimedia file according to claim 4, further including: an index information specifying section causing a user to specify one or more of said management units associated with said multimedia file as a title frame, wherein said index information generating section generating second index information in which a bit stream obtained by encoding a specified title frame is embedded and said index information recording section recording said index information and said second index information onto a recording medium together with flags indicating kinds of said index information and said second index information, respectively, attaching said index information and said second index information to said multimedia file together with said flags indicating kinds of said index information and said second index information.

\* \* \* \* \*